United States Patent [19]
Hamada

[11] Patent Number: 4,940,310
[45] Date of Patent: Jul. 10, 1990

[54] OPTICAL SCANNING DEVICE USING PLURAL SOURCES OF DIFFERING WAVELENGTHS

[75] Inventor: Akiyoshi Hamada, Toyokawa, Japan

[73] Assignee: Minolta Camera Kabushiki Kaisha, Osaka, Japan

[21] Appl. No.: 356,879

[22] Filed: May 25, 1989

Related U.S. Application Data

[62] Division of Ser. No. 27,750, Mar. 19, 1987, abandoned.

[30] Foreign Application Priority Data

| Mar. 19, 1986 | [JP] | Japan | 61-62585 |
| Mar. 19, 1986 | [JP] | Japan | 61-62586 |
| Mar. 19, 1986 | [JP] | Japan | 61-62587 |
| Mar. 20, 1986 | [JP] | Japan | 61-63753 |

[51] Int. Cl.$^5$ .............................................. H01J 3/14
[52] U.S. Cl. ...................................... 250/236; 358/494
[58] Field of Search .......................... 250/234–236, 250/226; 358/292–294, 481, 494

[56] References Cited

U.S. PATENT DOCUMENTS

| 3,970,845 | 7/1976 | Hollis et al. | 250/236 |
| 4,178,064 | 12/1979 | Mrdjen | 250/235 |
| 4,205,350 | 5/1980 | Gunning | 250/235 |
| 4,239,011 | 5/1982 | Mori et al. | 350/6.6 |
| 4,616,132 | 10/1986 | Kessler | 250/236 |
| 4,694,164 | 9/1987 | Noguchi | 358/293 |

FOREIGN PATENT DOCUMENTS

| 53-3833 | 1/1978 | Japan . |
| 56-124982 | 9/1981 | Japan . |
| 57-23914 | 2/1982 | Japan . |

*Primary Examiner*—David C. Nelms
*Assistant Examiner*—Stephone B. Allen
*Attorney, Agent, or Firm*—Price, Gess & Ubell

[57] ABSTRACT

An optical scanning device having a first optical beam source for exciting a first optical beam to be modulated based on an image signal, a beam scanning device having a reflecting face for scanning the first optical beam on a photosensitive face, a second optical beam source for exciting a second optical beam for generating a modulation start signal for the first optical beam and a light receiving element for receiving the second optical beam having been reflected by the beam scanning device. The second optical beam source is arranged so as to prevent its reflected optical beam when scanned by the beam scanning device from being directed toward the photosensitive face. Having detected the second optical beam, the light receiving element generates a signal for starting the modulation of the first optical beam.

9 Claims, 4 Drawing Sheets

OPTICAL SCANNING DEVICE USING PLURAL SOURCES OF DIFFERING WAVELENGTHS

This is a division of application Ser. No. 027,750, filed Mar. 19, 1987 now abandoned.

BACKGROUND OF THE INVENTION

(1) FIELD OF THE INVENTION

The present invention relates to an optical scanning device designed such that an image forming optical beam to form a latent image on a photoreceptor member and a synchronous signal generating optical beam generated independently thereof are reflected on a same reflecting face of a rotary polygon mirror.

(2) DESCRIPTION OF THE PRIOR ART

An optical scanning device employed in a laser beam printer and the like has a rotary polygon mirror for scanning optical beam. A problem with such device is that lines to be scanned by the optical beam are not always aligned with one another in a sub scanning direction because of some manufacturing errors in angle dividing precision of the reflecting face of the rotary polygon mirror or because of irregularities or vibrations associated with the rotation of the rotary polygon mirror. One prior art method attempting to overcome this problem is as follows: A light receiving section for detecting the optical beam is disposed on a scanning line more upstream than a photoreceptor member. When a predetermined time period has elapsed after the light receiving section detects the optical beam, a modulation of this optical beam based on an image signal is started, thereby to synchronize a timing of the start of the modulation. Accordingly, the latent image formed by scanning by a plurality of times the optical beam on the photoreceptor member moved in the sub scanning direction can be aligned with the sub scanning direction.

However, it is necessary to dispose the above-described light receiving section for detecting the optical beam and for controlling the synchronization of the modulation so as to be away from the latent image forming area on the photoreceptor member. In the case of a construction using the same optical beam both for forming the image and for synchronizing the start timing of the modulation, it takes considerable amount of time for the optical beam to reach the latent image forming area after being detected by the light receiving section. That is to say, additional scanning of the optical beam is needed for generating the synchronous signal, thereby to slow down the image forming operation.

One prior art method for overcoming this problem is disclosed in Japanese patent application laid open under NO. 53-3833, in which independent optical beams are used respectively for forming the image and for generating the synchronous signal thereby eliminating the additional scanning operation and consequently speeding up the image forming operation. However, according to this method, in connection with the rotation of the rotary polygon mirror, the optical beam for generating the synchronous signal scans also the latent image forming area on the photoreceptor member. This results in the photoreceptor member also being exposed to the optical beam for generating the synchronous signal, causing noises in image information leading to image deterioration. Therefore, there has been desired an optical scanning device with which the synchronous signal generating optical beam does not disadvantageously affect the image.

SUMMARY OF THE INVENTION

It is, accordingly, an object of the present invention to overcome the disadvantages in the prior art optical scanning device by providing improved optical beam generating means for generating the synchronous signal.

The forgoing object is accomplished in one embodiment by providing first optical beam generating means for generating a first beam to be modulated based on an image signal, optical beam scanning means having at least one reflecting face for scanning the first beam on a photosensitive face, second optical beam generating means for generating a second optical beam to be applied to the reflecting face, the second optical beam means being disposed in such a way as to prevent the second optical beam, to be scanned by the optical beam scanning means from being applied to the photosensitive face, and a light receiving element for detecting the second optical beam having been reflected by the reflecting face and for starting the modulation of the first optical beam thereafter.

More specifically, by causing the first beam, i.e. the optical beam for forming the image, to be reflected in an obliquely downward direction after the beam is applied to the reflecting face from an obliquely upward direction, or even in the case of scanning the two optical beams on the same plane, by causing both beams to be applied to the reflecting face of the rotary polygon mirror with suitable angle difference between the beams, it is possible to refract the synchronous signal optical beam reflected by the reflecting face of the polygon mirror in a location away from the photoreceptor member, whereby the photoreceptor member is not exposed to the synchronous signal generating optical beam and a latent image is formed without causing the noises in the image information.

The foregoing object is also accomplished in another embodiment by providing the first optical beam generating means for generating a first beam to be modulated based on an image signal, the optical beam scanning means having at least one reflecting face for scanning the first beam on a photosensitive face, the second optical beam generating means for generating a second optical beam to be applied to the reflecting face, a wave length of the second beam being within a wave length range where a sensitivity of the photosensitive face is substantially lower, and the light receiving element for detecting the second optical beam having been reflected by the reflecting face and for starting the modulation of the first optical beam thereafter.

According to the above construction, even if the second beam, i.e. the synchronous signal generating beam is eradiated onto the latent image forming area of the photoreceptor member, since a spectral sensitivity of the photoreceptor member is lower than the wave length of the synchronous signal generating optical beam, the photoreceptor member is not so considerably exposed as being exposed when scanned by the first beam, i.e. the image forming optical beam, whereby the latent image will be formed which does not cause the noises in the image information.

The foregoing object is also accomplished in a further embodiment by providing the first optical beam generating means for generating a first beam to be modulated based on an image signal, the optical beam scanning means having at least one reflecting face for scanning the first beam on a photosensitive face, the second optical beam generating means for generating a second optical beam to be applied to the reflecting face, the second beam having a lower beam intensity than the first beam, and the light receiving element for detecting the second optical beam having been reflected by the reflecting face and for starting the modulation of the first optical beam thereafter.

According to this construction, since the second beam, i.e. the synchronous signal generating optical beam has the lower beam intensity than the first beam, even if the synchronous signal generating optical beam is applied to the latent image forming area of the photoreceptor member, the photoreceptor member is not so considerably exposed by this synchronous signal generating optical beam as being exposed when scanned by the image forming optical beam, whereby the latent image will be formed which does not cause the noises in the image information.

Especially, in the case the photoreceptor member is constituted by a high contrast material, i.e. the member has a large gamma value, it is readily possible to render the intensity of the synchronous signal generating optical beam lower than a threshold sensitivity value of the photosensitivity member merely by rendering the same about 1/10 lower than that of the image forming optical beam.

The foregoing object is also accomplished in yet another embodiment by providing the first optical beam generating means for generating a first beam to be modulated based on an image signal, the optical beam scanning means having at least one reflecting face for scanning the first beam on a photosensitive face, the second optical beam generating means for generating a second optical beam to be applied to the reflecting face, the light receiving element for detecting the second optical beam having been reflected by the reflecting face and for starting the modulation of the first optical beam thereafter and means for modulating the second optical beam so as to stop the second beam when the same is to be scanned on the photosensitive face.

According to this construction, since the synchronous signal generating optical beam is stopped by the modulating means therefore before reaching the latent image forming area of the photoreceptor member, the photoreceptor member is not exposed whereby the latent image will be formed which does not at all cause the noises in the image information.

DESCRIPTION OF THE PREFERRED EMBODIMENTS

A first embodiment of the present invention will be particularly described hereinafter with reference to the accompanying drawings.

Figure 1:
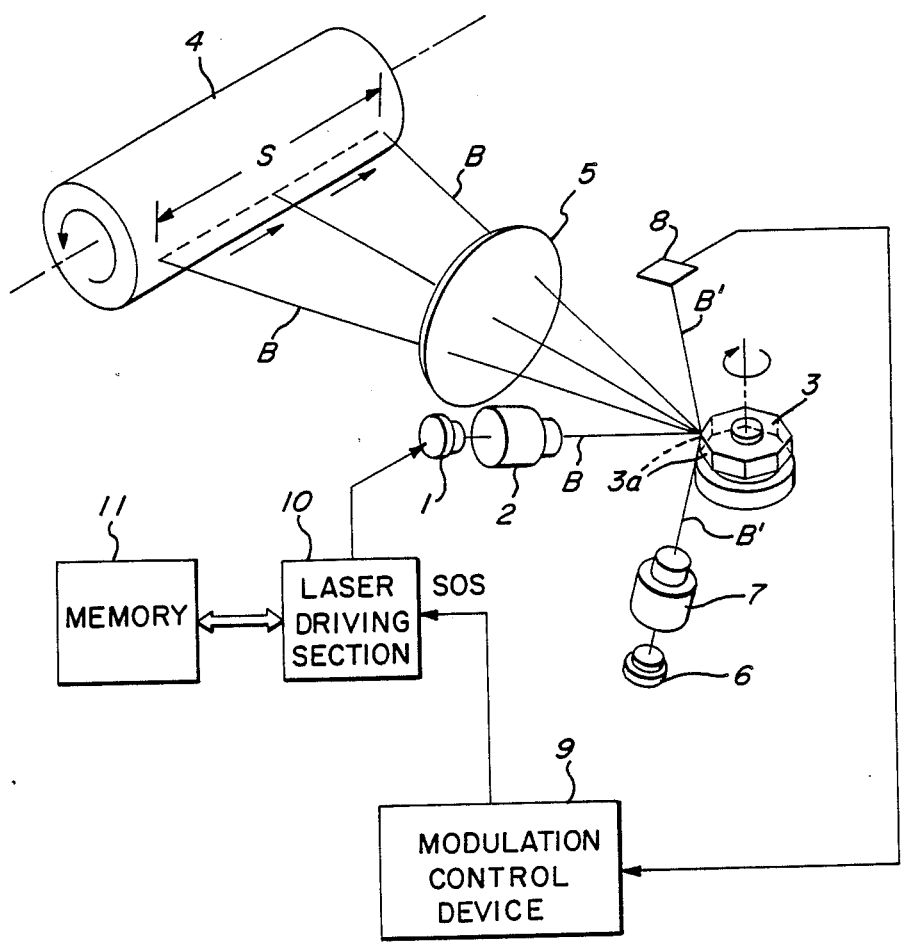
FIG. 1 is a schematic construction view showing a first embodiment of an optical scanning device related to the present invention.

FIG. 1 shows a schematic construction of a scanning device of a laser beam printer by way of example of an optical scanning device related to the present invention. A reference numeral 1 denotes an image forming semiconductor laser device for exciting an image forming laser beam B (to be shortly referred to as image beam hereinafter) which is modulated based on input image information. The image beam B excited by this image forming semiconductor device is processed through a collimator lens 2 to form a parallel light, which is then reflected by a reflecting face 3a of a high-speed rotary polygon mirror 3. With the rotation of this polygon mirror 3, the reflected image beam B is scanned in a longitudinal direction of a photoreceptor drum 4 (this direction will be referred to as main scanning direction).

This image beam B is projected by an f lens 5 to form an image on the uniformly electrified photoreceptor drum 4 thereby reducing an electrostatic charge voltage at its present position. By repeating this scanning operation with a constant speed rotation of the photoreceptor drum 4, an electrostatic latent image is formed on the photoreceptor drum 4.

Thereafter, though not shown, this electrostatic latent image undergoes a development, a transfer and a fixing and then is transformed into a visible image on a copy paper.

Independently of the image forming semiconductor laser device 1, there is also provided a synchronous signal generating semiconductor laser device 6. This synchronous signal generating semiconductor device 6 excites a synchronous signal generating laser beam B' (which will be shortly referred to as SOS beam hereinafter), which is processed through another collimator lens 7 and then is reflected by the reflecting face 3a, which reflects the image beam B, concurrently therewith.

Figure 2:
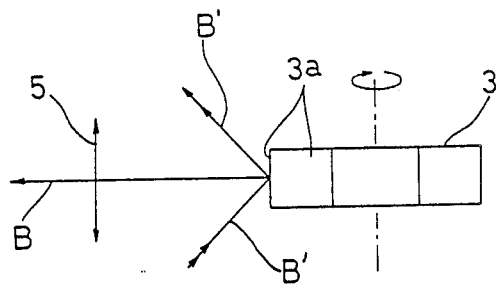
FIG. 2 is a view showing transmission paths of optical beams in the first embodiment.

In the case of the present laser beam printer, the SOS beam B' is, as shown in FIG. 2, applied to the reflecting face 3a of the polygon mirror 3 in an obliquely upward direction relative to a scanning field of the image beam B and then is reflected in an obliquely downward direction so as to be directed toward a synchronization control light receiving section 8. (It is to be noted here that the scanning field refers to an area swept by scanning of the beam.) With this arrangement, even if the SOS beam B' is scanned with the rotation of the polygon mirror 3, the SOS beam B' does not reach a latent image forming area S of the photoreceptor drum 4.

Therefore, on the photoreceptor drum 4 there is formed a latent image which does not have noises in the image information resulting in an image quality deterioration.

The SOS beam B' is so arranged as to be scanned in an area including the synchronization control light receiving section 8 with the rotation of the polygon mirror 3. This synchronization control light receiving section 8 outputs a signal for adjusting a latent image forming position for each scanning operation relative to a rotational direction of the photoreceptor drum 4 (will be referred to as sub scanning direction hereinafter).

Also, with the rotation of the polygon mirror 3, the SOS beam B' along with the image beam B is rotated in the same direction. The synchronous signal generating semiconductor laser device 6 is positioned relative to the image forming semiconductor laser device 1 in such a way as to permit the SOS beam B', which is scanned as well when the image beam B has reached a starting edge of the latent image forming area on the photoreceptor drum 4, to reach the synchronization control light receiving section 8.

The signal output from the synchronization control light receiving section 8 is input to a modulation control device 9, which outputs a synchronous signal $\overline{SOS}$ to a laser driving section 10 for the image forming semiconductor laser device 1 when the output of the synchronization control light receiving section 8 having received the SOS beam B' exceeds a predetermined value. Having received this signal $\overline{SOS}$, the laser driving section 10 starts a direct modulation for the image forming semiconductor laser 1 based on an image signal output from a memory 11, thereby starting an electrostatic latent image forming operation using the image beam B which is modulated and output.

With the above-described construction, the electrostatic latent image formed by repeated scanning operations on the photoreceptor drum 4 is aligned with the sub scanning direction. Further, since the synchronous signal $\overline{SOS}$ is generated by using the SOS beam B' provided independently of the image beam B, the image beam B need be scanned over a smallest area needed for the image formation, whereby the image formation may be carried out faster compared with the construction in which the image beam B is scanned as far as the synchronization control light receiving section 8.

In the case of the above-described construction, the scanning field of the image beam B and that of the SOS beam B' cross each other. In place of this, even if these scanning fields of the two beams B and B' are so arranged as to be positioned on a same plane, it is possible to prevent the SOS beam B' from being scanned in the latent image forming area of the photoreceptor drum 4 by suitably setting incidence angles of the two beam B, B' onto the reflecting face 3a of the polygon mirror 3.

This will be described next with reference to FIGS. 3 and 4.

Figure 3:
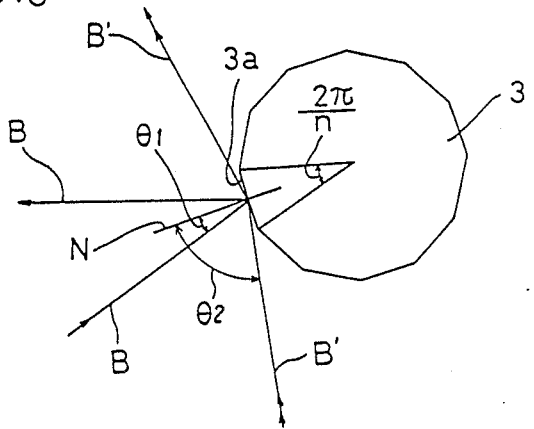
FIGS. 3 and 4 are views showing transmission paths of the optical beams illustrating alternate embodiments of the first embodiment.

FIG. 3 illustrates a case where the image beam B and the SOS beam B' enter from a same side relative to a normal line N of the reflecting face 3a. At the center of the reflecting face 3a, if the incidence angles of the image beam B and of the SOS beam B' are $\theta 1$ and $\theta 2$ respectively, the beams B, B' having been reflected by the reflecting face 3a are refracted maintaining an angle of $\theta 1-\theta 2$.

This reflecting face 3a, with the rotation of the polygon mirror 3, has an inclination thereof relative to either of the beams B or B' varied by $2\pi/n$ ('n' is a number of the reflecting faces 3a constituting the polygon mirror 3). Accordingly, both of the beams B and B' having been reflected by the reflecting face 3a are refracted within $\pm 2\pi/n$ from positions thereof shown in the same figure, respectively.

That is to say, in order to prevent the SOS beam B' from being scanned over the latent image forming area S of the photoreceptor drum 4, it is necessary for the scanning fields of the image beam B and of the SOS beam B' not to overlap with each other. In other words, conditions satisfying the following expression:

$\theta 2 - \theta 1 \geq 4\pi/n$ are required.

Figure 4:
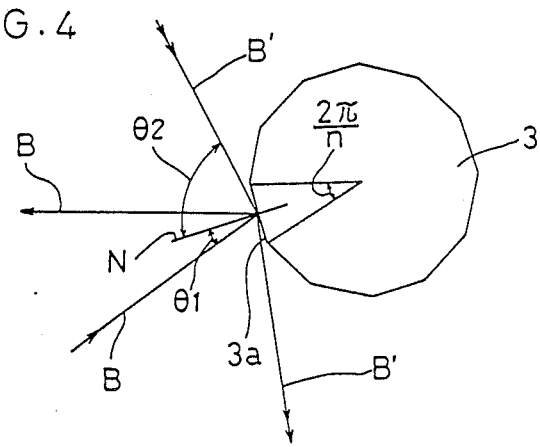

FIG. 4 illustrates a case where the image beam B and the SOS beam B' enter from the opposite sides relative to the normal line N. In this case also, conditions satisfying the following expression:

$\theta 2 - \theta 1 \geq 2\pi/n$ are required.

Figure 5:
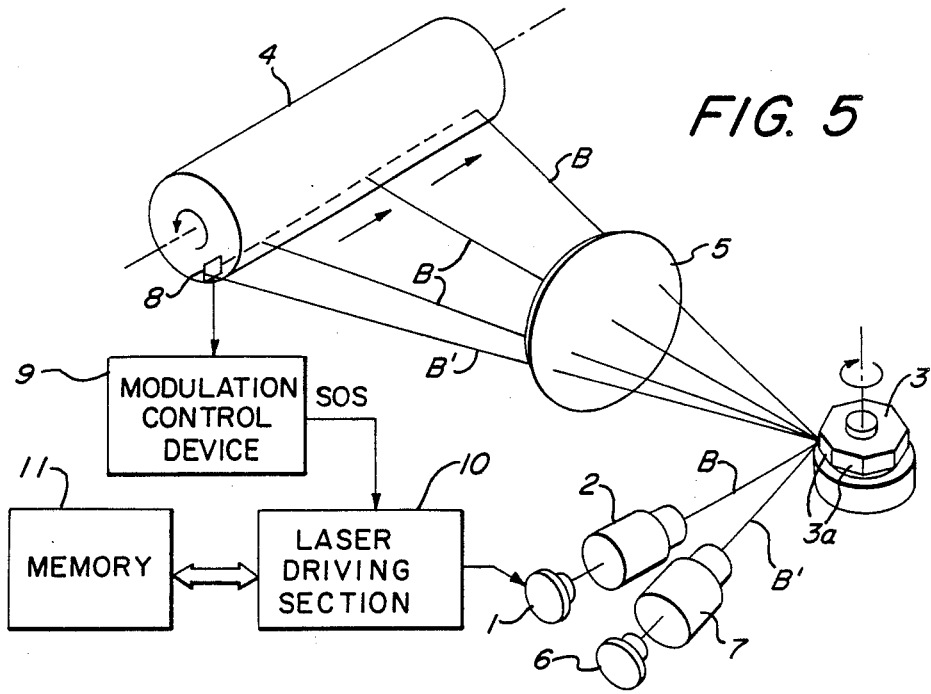
FIG. 5 is a schematic construction view showing second and third embodiments of the optical scanning device related to the present invention.
Figure 6:
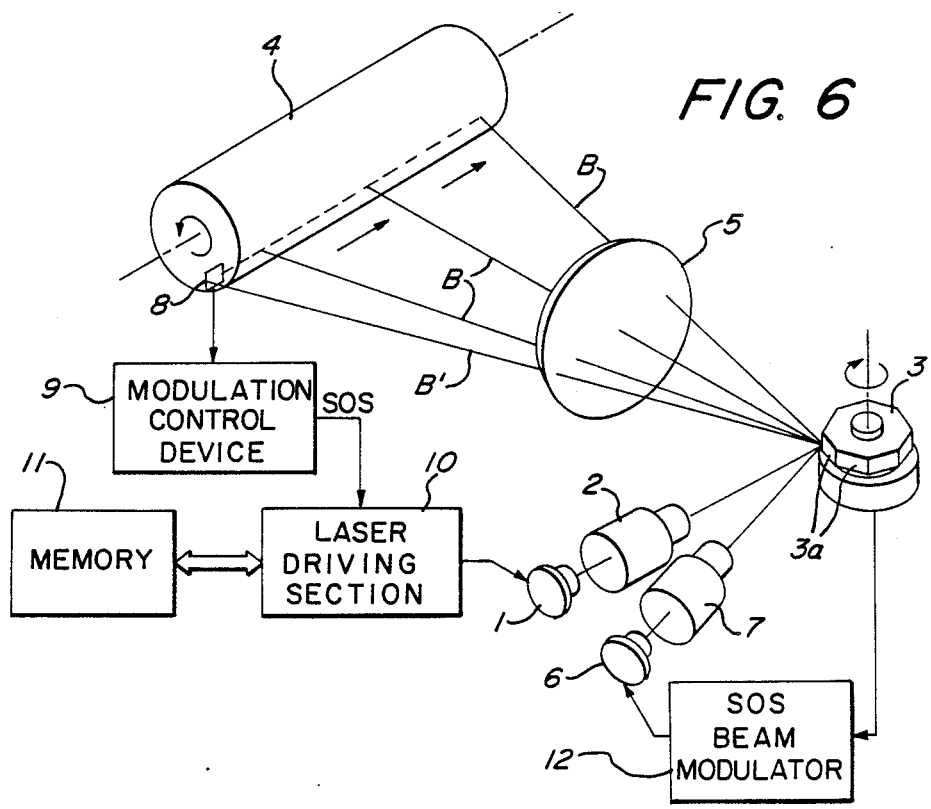
FIG. 6 is a schematic construction view showing a fourth embodiment of the optical scanning device related to the present invention.

A second embodiment of the present invention will be described with reference to FIG. 5.

In the following description, it is to be noted, in order to avoid redundancy, only differences from the first embodiment will be discussed. The rest are to be referred to the foregoing description of the first embodiment.

How the second embodiment differs from the first one in construction is that the SOS beam B' excited by the synchronous signal generating semiconductor laser device 6, processed through the collimator lens 7 and then reflected by the reflecting face 3a of the polygon mirror 3 is projected by the f $\theta$ lens 5 and reaches the synchronization control light receiving section 8 disposed nearer the starting point of scanning cycle than the photoreceptor drum 4.

In the case of the laser beam printer having the above-described construction and constituting the second embodiment of the present invention, a wave length of the SOS beam B' is within a range lower or higher than the spectral sensitivity of the photoreceptor drum 4. That is to say, with the rotation of the polygon mirror 3, the SOS beam B' is also partially scanned on the photoreceptor drum 4. Thus, in order to prevent the latent image causing noises in the image information from being formed even if the SOS beam B' is scanned on the photoreceptor drum 4, the wave length of the SOS beam B' is out of the high sensitivity range of the photoreceptor drum 4.

More specifically, for example, in the case the image forming semiconductor laser device 1 is constituted by GaAlAs which wave length varies from 780 nm through 830 nm and the photoreceptor drum 4 includes a silicon compound which is highly sensitive in a range from 700 nm through 900 nm, the synchronous signal generating semiconductor laser device 6 may be constituted by InGaAsP for providing the SOS beam B' which wave length varies from 1300 nm through 1600 nm.

A third embodiment of the present invention will be particularly described next.

This embodiment does not differ from the above-described second embodiment in construction. However, while the wave length of the SOS beam B' lies in the range where the spectral sensitivity of the photoreceptor drum 4 is low in the second embodiment, in this third embodiment an intensity of the SOS beam B' is lower than that of the image beam B and at the same time the same is lower than a threshold photosensitivity value of the photoreceptor drum 4. That is to say, if the SOS beam B' is scanned on the photoreceptor drum 4 with the rotation of the polygon mirror 3, the latent image is formed causing noises in the image information. Therefore, in order to avoid this, even if the SOS beam B' is scanned on the photoreceptor drum 4, the above-described arrangement prevents the photoreceptor drum 4 from being exposed thereto.

The intensity of the SOS beam B' need only be within a range where the noises in the obtained image are practically negligible; thus, the intensity is not necessarily lower than the threshold photosensitivity value.

A fourth embodiment of the present invention will be described next.

In this embodiment, there is also provided an SOS beam modulation means 12 for directly modulating the synchronous signal generating semiconductor laser device 6 in such a way as to permit the SOS beam B' to be scanned only in an area except the latent image forming area of the photoreceptor drum 4.

More particularly, if the SOS beam B' is scanned on the photoreceptor drum 4 with the rotation of the polygon mirror 3, the latent image is formed causing the noises in the image information. In order to avoid this, the above arrangement prevents the SOS beam B' from being scanned on the photoreceptor drum 4. It is to be noted that clock signals for modulating the synchronous signal generating semiconductor laser device 6 are provided by a drive clock (not shown) for the polygon mirror 3.

Also, it is possible to use the synchronous signal SOS output from the light receiving section 8 as the signal for modulating the laser device 6. In this case, a preset timer(s) is (are) started upon occurrence of the synchronous signal $\overline{SOS}$ thereby to stop the beam B' for a predetermined time period.

Figure 7:
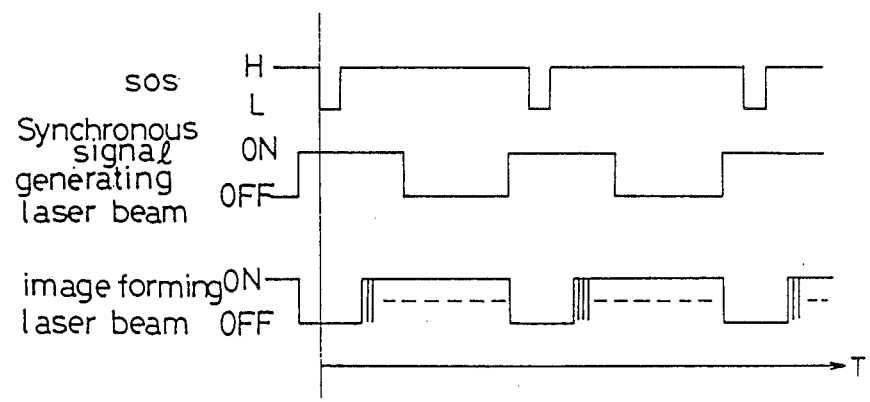
FIG. 7 is a timing chart of the optical beams and of a synchronous signal in the fourth embodiment.

FIG. 7 is a timing chart illustrating the modulation of the image beam B by the image forming laser device drive section 10, the modulation of the SOS beam B' by the SOS beam modulation means 12 and the synchronous signal $\overline{SOS}$.

As seen in FIG. 7, the SOS beam B' may be modulated by a relatively long cycle. This is because the SOS beam B' and the image beam B form different angles with respect to the reflecting face 3a of the polygon mirror 3. Therefore, the SOS beam modulation means need not be of a high-performance type, whereby this construction may be simple and economical.

The SOS beam modulation means 12 may be of the afore-mentioned type for stopping the SOS beam B' for a predetermined time period; otherwise, the means 12 may also be of a type for reducing the intensity of the SOS beam B' while the same is being scanned on the photoreceptor drum 4 to be lower than the sensitivity of the photoreceptor drum 4.

Nextly, alternate constructions and arrangements commonly applicable to the above-described first through fourth embodiments will be described next.

In the previous embodiments, the image beam B and the SOS beam B' are independently provided by the two semiconductor laser devices 1 and 6, respectively. In place of this, it is also possible to obtain one or the both of the beams from a gas laser device or from a solid laser device.

Further, in place of the aforementioned various types of laser beams, an optical beam from an LED may be used for generating the synchronous signal, these beams are generically referred to as the SOS beam B'.

In this case, in the fourth embodiment, if the SOS beam B' is provided by the gas laser device or by the solid laser device, an optical modulation device may be provided for modulating this SOS beam B'. The optical modulation device may comprise any of an AO (acoustic-optical) modulator, an electrochromic element, a PLZT element or even a mechanical stop in case the modulation frequency is not considerably high.

Figure 8:
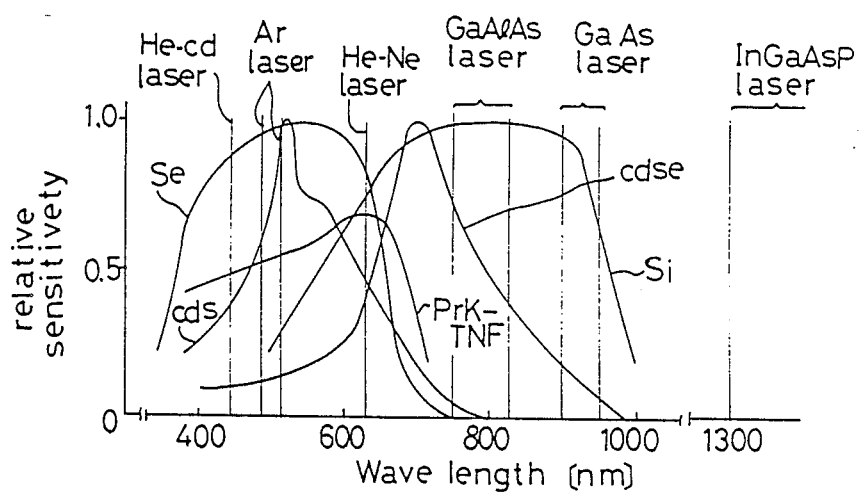
FIG. 8 is a graph showing spectral sensitivity characteristics of a photoreceptor member and oscillation wave lengths of the optical beams.

Also, in this case, in the second embodiment, the image beam, the SOS beam and the photoreceptor drum are suitably selected referring to FIG. 8 showing the spectral sensitivity characteristics of various photoreceptor drum 4 and oscillation wave lengths of various optical beams.

For instance, for the aforementioned combination of the image forming semiconductor laser device 1 constituted by GaAlAs and the photoreceptor drum 4 constituted by a silicon, the SOS beam B' may be obtained from an He-Cd laser device having a wave length of 442 nm. Further, of the laser beams having two kinds of wave lengths obtained from an Ar laser device, one having a wave length of 514.5 nm may be used as the image beam B with a CdS photoreceptor drum 4 having a spectral sensitivity peak adjacent 520 nm and the other having a wave length of 488 nm may be used as the SOS beam B'. In this case, it becomes possible to co-utilize a part of the optical system.

Still further, in the case the photoreceptor drum 4 is constituted by a selenium which is highly sensitive in a range from 450 nm through 650 nm and the image beam B is obtained from the Ar laser, it is possible to use as the SOS beam B' an optical beam from an LED having a wave length of approximately 700 nm.

Moreover, in the first, third and fourth embodiments, it is possible to obtain the SOS beam B' by separating the image beam B provided by the same gas laser or solid laser device by means of a suitable optical element.

In this case, needless to say, such an additional arrangement is needed as disposing a filter in an optical path of the SOS beam B' for reducing the light amount.

In all of the previously described embodiments, the image beam B and the SOS beam B' are applied to the same spot on the reflecting face 3a of the polygon mirror 3. In place of this, these two kinds of beams B and B' may be applied to different spots on the same reflecting face 3a. However, it is to be noted, in the case the reflecting face 3a of the polygon mirror 3 does not have a high face-precision, it is better that the two kinds of beams B and B' are applied to the same spot.

The optical scanning device related to the present invention may be employed not only for the laser beam printer described in the aforementioned embodiments, but also for a laser facsimile, a COM (Computer Output Microfilm) system in which a microfilm is exposed by a laser beam and the like.

In the case of the COM system and the like carrying out a high-density recording, a scanning lens such as the fθ lens 5 converges the image beam B into an extremely small radius. Therefore, in order to avoid a problem that the excessively converged SOS beam B' may be hardly detected by the synchronization control light receiving section 8, it is desirable for the SOS beam B' not to pass the scanning lens, e.g. the fθ lens 5. In this case, it is also to be noted, it is possible to form the scanning lens such as the fθ lens 5 compact since the same need only cover the scanning range of the image beam B.

What is claimed is:
1. An optical scanning device for scanning a photosensitive member, comprising:
   first optical beam generating means for generating a first beam having a wavelength range within a sensitivity range of the photosensitive member, the first beam being modulated based on an image signal and directed along a first optical path;
   beam scanning means having at least one reflecting face for scanning the first beam on a photosensitive face of the photosensitive member;

second optical beam generating means for generating a second beam to be applied to the reflecting face and directed along a second optical path separate from the first optical path, a design wave length of the second beam being within a wave length range where a sensitivity of the photosensitive face is substantially lower than the wavelength of the first beam; and a light receiving element for detecting the second beam having been reflected by the reflecting face and for outputting a signal for starting the modulation of the first beam.

2. An optical scanning device, as defined in claim 1, wherein said second optical beam generating means is disposed so as to permit the second beam to illuminate said light receiving element when the first beam reaches an image forming starting spot on the photosensitive face.

3. An optical scanning device for scanning a photosensitive member, comprising:

first optical beam generating means for generating a first beam having a wavelength range within a sensitivity range of the photosensitive member, the first beam being modulated based on an image signal;

beam scanning means having at least one reflecting face for scanning the first beam on a photosensitive face of the photosensitive member;

second optical beam generating means for generating a second beam to be applied to the reflecting face; said second beam having a significantly lower beam intensity than said first beam, the beam intensity being approximately lower than a threshold sensitivity level of the photosensitive member; and a light receiving element for detecting the second beam having been reflected by the reflecting face and for outputting a signal for starting the modulation of the first beam.

4. An optical scanning device, as defined in claim 3, wherein said second beam generating means is disposed so as to permit the second beam to illuminate said light receiving element when the first beam reaches an image forming starting spot on the photosensitive face.

5. An optical scanning device, as defined in claim 3, wherein the beam intensity of said second beam is approximately 1/10 of the beam intensity of said first beam.

6. An optical scanning device, comprising:

first optical beam generating means for generating a first beam to be modulated based on an image signal;

beam scanning means having at least one reflecting face for scanning the first beam on a photosensitive face;

second optical beam generating means for generating a second beam to be applied to the reflecting face;

a light receiving element for detecting the second beam having been reflected by the reflecting face and for outputting a signal for starting the modulation of the first beam; and second beam modulating means for modulating the second beam, said means stopping the second beam during the period that the second beam would be scanned on the photosensitive face.

7. An optical scanning device, as defined in claim 6, wherein said second beam modulating means modulates the second beam in response to a signal synchronous with the scanning by said beam scanning means.

8. An optical scanning device, as defined in claim 6, wherein said second beam modulating means modulates the second beam in response to the signal from said light receiving element.

9. An optical scanning device, as defined in claim 6, wherein said second optical beam generating means is disposed so as to permit the second beam to illuminate said light receiving element when the first beam reaches an image forming starting spot on the photosensitive face.

* * * * *